United States Patent
Hoskeri et al.

(10) Patent No.: US 9,958,865 B2
(45) Date of Patent: May 1, 2018

(54) SYSTEMS AND METHODS TO ENABLE OR DISABLE AUTONOMOUS DRIVING

(71) Applicant: GM GLOBAL TECHNOLOGY OPERATIONS LLC, Detroit, MI (US)

(72) Inventors: Nikhil L. Hoskeri, Ann Arbor, MI (US); Curtis Hay, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days. days.

(21) Appl. No.: 14/975,348

(22) Filed: Dec. 18, 2015

(65) Prior Publication Data

US 2017/0176991 A1    Jun. 22, 2017

(51) Int. Cl.

| | |
|---|---|
| *G05D 1/00* | (2006.01) |
| *G01C 21/34* | (2006.01) |
| *G01S 19/43* | (2010.01) |
| *G01S 19/01* | (2010.01) |
| *G01S 19/47* | (2010.01) |
| *B60W 50/00* | (2006.01) |

(52) U.S. Cl.
CPC .......... *G05D 1/0088* (2013.01); *B60W 50/00* (2013.01); *G01C 21/34* (2013.01); *G01S 19/01* (2013.01); *G01S 19/43* (2013.01); *G01S 19/47* (2013.01); *G05D 1/0061* (2013.01); *G05D 2201/0213* (2013.01)

(58) Field of Classification Search
CPC ........ G05D 1/0088; G01C 21/34; G01S 19/01

USPC .......................................................... 701/23
See application file for complete search history.

(56) References Cited

U.S. PATENT DOCUMENTS

| 5,646,843 A * | 7/1997 | Gudat ................ B60K 31/0008 348/114 |
|---|---|---|
| 9,562,779 B2 * | 2/2017 | Lynch .................... G01C 21/30 |
| 2012/0265391 A1* | 10/2012 | Letsky ................. A01D 34/008 701/25 |
| 2014/0156134 A1* | 6/2014 | Cullinane ............. B60W 30/00 701/23 |
| 2014/0316635 A1* | 10/2014 | Bando .................. G05D 1/0274 701/25 |
| 2015/0112537 A1* | 4/2015 | Kawamata ............. G01C 21/34 701/23 |
| 2016/0178381 A1* | 6/2016 | Lynch .................... G01C 21/30 701/23 |
| 2016/0259335 A1* | 9/2016 | Oyama ................ G05D 1/0077 |
| 2016/0378114 A1* | 12/2016 | Laur ..................... B60W 30/00 701/23 |
| 2017/0122749 A1* | 5/2017 | Urano .................... G01C 21/30 |
| 2017/0123434 A1* | 5/2017 | Urano .................. G05D 1/0278 |

* cited by examiner

*Primary Examiner* — Krishnan Ramesh
(74) *Attorney, Agent, or Firm* — Lorenz & Kopf, LLP (57) ABSTRACT

An autonomous driving system for a vehicle is provided. The system includes a location unit configured to determine a current location of the vehicle; a database storing mapping information; and a control unit coupled to the location unit and the database, the control unit configured to selectively generate autonomous driving commands for the current location in view of the mapping information.

9 Claims, 4 Drawing Sheets

SYSTEMS AND METHODS TO ENABLE OR DISABLE AUTONOMOUS DRIVING

TECHNICAL FIELD

The present invention generally relates to autonomous driving systems and methods, and more particularly relates to systems and methods for enabling or disabling autonomous driving functions.

BACKGROUND OF THE INVENTION

Autonomous driving systems and methods have been developed to provide autonomous, or automatic, control of vehicles, such as automobiles. These systems and methods allow for the vehicle to drive itself, including identifying and navigating roads and avoiding incidents with other vehicles. In certain situations, autonomous operation may not be available or appropriate. As such, a control system is typically able to switch between at least autonomous operation, in which a computing device controls operation of the vehicle, and manual operation, in which the driver controls the vehicle.

Increasingly, autonomous driving systems and methods rely upon information received from sources outside the vehicle, such as data from GPS satellites or cellular networks. Although this data improves, as an example, the accuracy of navigation, issues remain with respect to processing and management of the various types of information within the context of overall operation.

Accordingly, it is desirable to provide improved systems and methods for autonomous driving. Furthermore, other desirable features and characteristics of the present invention will become apparent from the subsequent detailed description and the appended claims, taken in conjunction with the accompanying drawings and the foregoing technical field and background.

SUMMARY OF THE INVENTION

In accordance with an exemplary embodiment, an autonomous driving system for a vehicle is provided. The system includes a location unit configured to determine a current location of the vehicle; a database storing mapping information; and a control unit coupled to the location unit and the database, the control unit configured to selectively generate autonomous driving commands for the current location in view of the mapping information.

In accordance with another exemplary embodiment, a method is provided for operating a vehicle. The method includes determining a current location of the vehicle from at least GNSS signals; evaluating the current location in view of mapping information stored in a database, the mapping information including mapped coordinates; and selectively receiving GNSS corrections when the current location corresponds to at least one of the mapped coordinates.

BRIEF DESCRIPTION OF THE DRAWINGS

The present invention will hereinafter be described in conjunction with the following drawing figures, wherein like numerals denote like elements.

DETAILED DESCRIPTION OF THE DRAWINGS

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
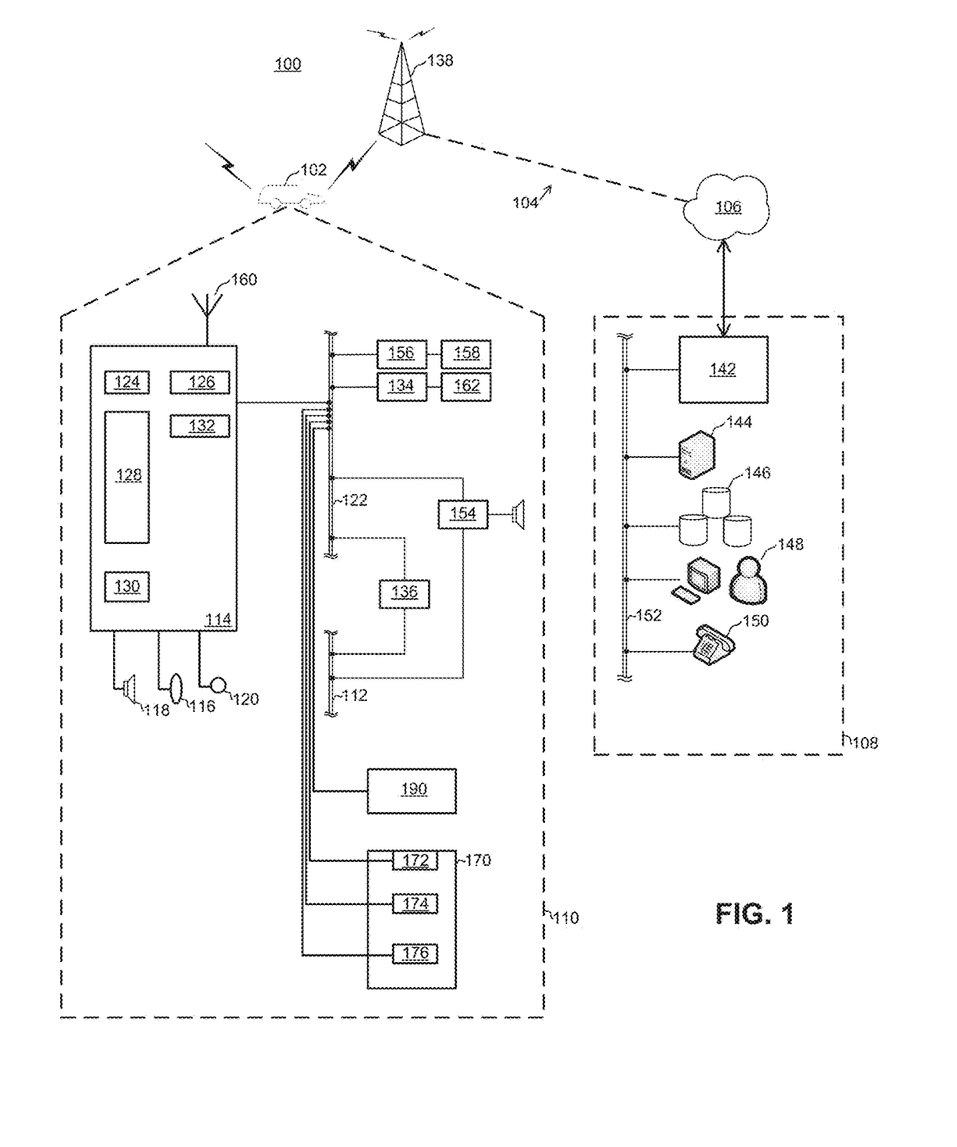
FIG. 1 is a block diagram of a vehicle system in accordance with an exemplary embodiment.

FIG. 1 is a block diagram of a vehicle system 110 associated with a vehicle 102 operating within the context of a communication system 100. In general, FIG. 1 depicts a non-limiting example of the communication system 100 that may be used together with examples of the apparatus/system disclosed herein or to implement examples of the methods disclosed herein. The communication system 100 generally includes or otherwise interacts with the vehicle 102, a wireless carrier system 104, a land network 106, and a call center 108. It should be appreciated that the overall architecture, setup and operation, as well as the individual components of the illustrated system are merely exemplary and that differently configured communication systems may also be utilized to implement the examples of the method disclosed herein. Thus, the following paragraphs, which provide a brief overview of the illustrated communication system 100, are not intended to be limiting.

The vehicle 102 may be any type of mobile vehicle such as a motorcycle, car, truck, recreational vehicle (RV), boat, plane, etc., and is equipped with the vehicle system 110 containing suitable hardware and software for implementing the systems and methods described herein. One example of the vehicle system 110 is depicted in FIG. 1, portions of which may be considered part of, or otherwise interact with, the communication system 100. As shown, the vehicle system 110 may include a telematics unit 114 coupled to a microphone 116, a speaker 118, and buttons and/or controls 120 that may function as one or more user interfaces. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO (International Organization for Standardization), SAE (Society of Automotive Engineers), and/or IEEE (Institute of Electrical and Electronics Engineers) standards and specifications, to name a few.

The telematics unit 114 is an onboard device that provides a variety of services through its communication with the call center 108, and generally includes an electronic processing device 128, one or more types of electronic memory 130, a cellular receiver 124, a wireless modem 126, a Global Navigation Satellite System (GNSS) receiver 132, and a dual mode antenna 160. In one example, the wireless modem 126 includes a computer program and/or set of software routines adapted to be executed within electronic processing device 128.

The telematics unit 114 may provide various services, including: turn-by-turn directions and other navigation-related services provided in conjunction with the autonomous driving system 190; airbag deployment notification and other emergency or roadside assistance-related services provided in connection with various crash and/or collision sensor interface modules 156 and collision sensors 158 located throughout the vehicle 102; and/or infotainment-related services where music, internet web pages, movies, television programs, videogames, and/or other content are downloaded by an infotainment center 136 operatively connected to the telematics unit 114 via vehicle bus 122 and audio bus 112. In one example, downloaded content is stored for current or later playback. The above-listed services are by no means an exhaustive list of all the capabilities of telematics unit 114, but are simply an illustration of some of the services that the telematics unit may be capable of offering. It is anticipated that telematics unit 114 may include a number of additional components in addition to and/or different components from those listed above. Additional details about the telematics unit 114 facilitating operation of an autonomous driving function are provided below.

Vehicle communications may use radio transmissions to establish a voice channel with wireless carrier system 104 so that both voice and data transmissions can be sent and received over the voice channel. Vehicle communications are enabled via the cellular receiver 124 for voice communications and the wireless modem 126 for data transmission. Any suitable encoding or modulation technique may be used with the present examples, including digital transmission technologies, such as TDMA (time division multiple access), CDMA (code division multiple access), W-CDMA (wideband CDMA), FDMA (frequency division multiple access), OFDMA (orthogonal frequency division multiple access), etc.

In one exemplary embodiment, the GNSS receiver 132 and cellular receiver 124 facilitate the navigation functions of the vehicle system 110. In particular, the GNSS receiver 132 may include any suitable hardware and software, such as a GPS chipset/component to receive GPS data. Any type of GNSS location system may be provided to receive location information from external satellite communication systems. The cellular receiver 124 may include any suitable hardware and software, such as a cellular chipset/component to receive GNSS correction data that may be used to correct the location calculations based on the GNSS data. Additional details about calculating location are provided below.

The dual mode antenna 160 may facilitate communication between the telematics unit 114 and other aspects of the communication system 100, including the wireless carrier system 104, land network 106 and call center 108. Additionally, the antenna 160 may service the GNSS receiver 132 and the cellular receiver 124.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides audible output to the vehicle occupants and can be either a stand-alone speaker specifically dedicated for use with the telematics unit 114 or can be part of a vehicle audio component 154. In either event, microphone 116 and speaker 118 enable vehicle system 110 and call center 108 to communicate with the occupants through audible speech.

The vehicle hardware also includes controls 120 for enabling a vehicle occupant to activate or engage one or more of the components of the vehicle system 110. For example, one control 120 may be an electronic pushbutton used to initiate voice communication with call center 108 (whether it be a human such as advisor 148 or an automated call response system). In another example, the control 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides amplitude modulated (AM) and frequency modulated (FM) radio, compact disc (CD), digital video disc (DVD), and multimedia functionality independent of the infotainment center 136. The audio component 154 may contain a speaker system, or may utilize speaker 118 via arbitration on vehicle bus 122 and/or audio bus 112.

The collision sensor interface module 156 is operatively connected to the vehicle bus 122. The collision sensors 158 provide information to the telematics unit via the collision sensor interface module 156 regarding the severity of a vehicle collision, such as the angle of impact and the amount of force sustained.

Vehicle sensors 162, connected to various sensor interface modules 134, are operatively connected to the vehicle bus 122. Example vehicle sensors 162 include but are not limited to gyroscopes, accelerometers, magnetometers, emission detection, control sensors, and the like. Additionally, vehicle sensors 162 may interact with various other systems to collect further types of data. The data from the vehicle sensors 162 may be used by many types of vehicle systems, including powertrain control, climate control, and body control, as examples.

Wireless carrier system 104 may be a cellular telephone system or any other suitable wireless system that transmits signals between the vehicle system 110 and land network 106. According to an example, wireless carrier system 104 includes one or more cell towers 138, as well as any other networking components required to connect the wireless carrier system 104 with land network 106. As appreciated by those skilled in the art, various cell tower/base station/MSC arrangements are possible and could be used with wireless carrier system 104.

Land network 106 can be a conventional land-based telecommunications network that is connected to one or more landline telephones, and that connects wireless carrier system 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call center 108 is designed to provide the vehicle system 110 with a number of different system back-end functions and, according to the example shown here, generally includes one or more switches 142, servers 144, databases 146, advisors 148, as well as a variety of other telecommunication/computer equipment 150. These various call center components are suitably coupled to one another via a network connection or bus 152, such as the one previously described in connection with the vehicle system 110. Switch 142, which can be a private branch exchange (PBX) switch, routes incoming signals so that voice transmissions are usually sent to either advisor 148 or an automated response system, and data transmissions are passed on to a modem or other piece of telecommunication/computer equipment 150 for demodulation and further signal processing. The modem or other telecommunication/computer equipment 150 may include an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a call center 108 that is manned, it will be appreciated that the call center 108 can be any central or remote facility, manned or unmanned, mobile or fixed, to or from which it is desirable to exchange voice and data.

As shown, the vehicle system 110 additionally includes one or more components that interact to provide autonomous driving. In particular, the vehicle system 110 includes an autonomous driving system 190 that functions to provide commands to an engine control module 172, a steering mechanism 174, and a braking arrangement 176 to operate a powertrain 170 of the vehicle 102. Generally, the powertrain 170 may include, for example, an engine (not shown) (e.g., an internal combustion engine or an electric motor), a transmission (not shown), and drive wheels (not shown), as is well appreciated by those skilled in the art. The engine control module 172 includes any suitable components for controlling operation of the engine. The steering mechanism 174 includes any suitable components for controlling the direction of travel of the vehicle 102. The braking arrangement 176 includes any suitable components for slowing and stopping the vehicle 102. The powertrain 170, steering mechanism 174, and braking arrangement 176 are shown only in block form and without further detailed description, as embodiments of these mechanisms are varied and generally understood. Although a number of components of the autonomous driving system 190 are described, the autonomous driving system 190 may include any number of additional controllers, actuators, sensors, and/or other components that control the operation, handling, and other characteristics of vehicle 102. Additional details about aspects of the autonomous driving system 190 are provided below.

Figure 2:
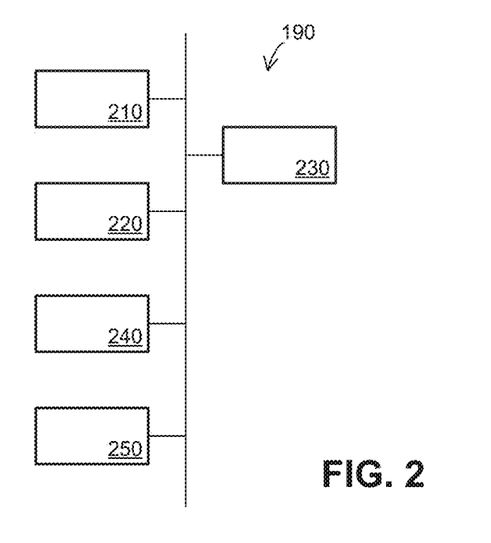
FIG. 2 is a block diagram of an autonomous driving system of the vehicle system of FIG. 1 in accordance with an exemplary embodiment.

FIG. 2 is a more detailed view of the autonomous driving system 190 of FIG. 1 in accordance with an exemplary embodiment. FIG. 1 is referenced in the discussion of FIG. 2 below. As shown, the autonomous driving system 190 may include a control unit 210, a user interface 220, a database 230, a sensor group 240, and a location unit 250 coupled together in any suitable manner, such as a data bus (e.g., bus 122). Generally, one or more functions of the autonomous driving system 190 may be integrated with or cooperate with other components of the system 100 of FIG. 1, or all or portions of the autonomous driving system 190 may be stand-alone components. A brief introduction of each component of the autonomous driving system 190 is provided prior to a more detailed description of the functions.

The control unit 210 functions to control operation of the autonomous driving system 190, and thus, autonomous operation of the vehicle 102. More specifically, the control unit 210 is in communication with the engine control module 172, the steering mechanism 174, and the braking arrangement 176. The control unit 210 executes one or more programs and, in accordance with the one or more programs, controls operation of the engine control module 172, the steering mechanism 174, and the braking arrangement 176. For instance, based on the identification and evaluation of the present location, the surrounding environment, and the state of the vehicle, the control unit 210 generates signals to automatically implement the appropriate dynamic response, such as causing the vehicle 102 to accelerate, decelerate, maintain a velocity, turn, and/or stop. The control unit 210 may additionally function to receive user commands regarding operation of the autonomous driving system 190 and generate messages or alerts to the user regarding operation of the autonomous driving system 190. Furthermore, those skilled in the art will appreciate other aspects of operating the vehicle 102 that may be controlled by the control unit 210. Further information about operation of the autonomous driving system 190, particularly enabling and disabling autonomous driving, will be discussed below.

Generally, the control unit 210 (as well as any of the components described herein) may include any variety of electronic processing devices, memory devices, input/output (I/O) devices, and/or other known components, and may perform various control and/or communication related functions. For example, control unit 210 may include an electronic processing device (e.g., a microprocessor, a microcontroller, an application specific integrated circuit (ASIC), etc.) that executes instructions for software, firmware, programs, algorithms, scripts, and/or applications that are stored in one or more memory devices and may govern the processes and methods described herein. Such memory devices may include various types of dynamic random access memory (DRAM) such as SDRAM, various types of static RAM (SRAM), and various types of non-volatile memory (PROM, EPROM, and flash).

The user interface 220 is any suitable input and output device the enables the user (typically, the driver) to communicate with the autonomous driving system 190. The user interface 220 may be realized as a display device, keypad, touchpad, keyboard, mouse, touch panel, joystick, knob, lights, line select key or another suitable device adapted to receive input from a user and/or provide information to the user. In further embodiments, the user interface 220 is realized as audio input and output devices, such as a speaker, microphone, audio transducer, audio sensor, or the like. In some exemplary embodiments, the user interface 220 may be incorporated into the components described above, such as the microphone 116, speaker 118, controls 120, and infotainment center 136.

The database 230 may store the data for implementing the exemplary embodiments described herein, particularly the autonomous driving functions. Such data may reside on the vehicle 102 and/or be downloaded or received from other portions of the system 110, e.g., via the telematics unit 114. In one exemplary embodiment, the database 230 stores data that enables the control unit 210 to form a driving plan, e.g., the appropriate driving function in view of various parameters, such as location and conditions. Such data may include, as examples, vehicle dynamics or driver input information (e.g., steering angle thresholds or ranges, vehicle lane offset thresholds, and other vehicle dynamics measurement or parameter thresholds) and sensor measured or collected vehicle dynamics data (e.g., measured steering angle, vehicle lane offset, vehicle position, yaw-rate, acceleration, velocity, timing data, and other vehicle dynamics data).

In one exemplary embodiment, the database 230 contains mapping information in the form of precisely mapped road networks and precisely mapped roads that facilitate autonomous operation. Such mapping information may be in the form of geographic or three-dimensional (3D) location, position, and/or appearance information of road features (e.g., lane markers, road shoulders, lane curvatures, lane forks, lane merges, road shoulders, median barriers, etc.). As described in greater detail below, the mapping information stored in database 230 may be in the form of a two-dimensional road mapping database that contains the precise coordinates for the lane boundaries of certain roads, particularly highways or interstates.

Generally, the sensor group 240 may include any one or more sensors or other sources of data that collect information for use by the autonomous driving system 190. In one exemplary embodiment, the sensor group 240 may include or be integrated with the collision and vehicle sensors 158, 162 discussed above. The sensor group 240 may include gyroscopes, accelerometers, magnetometers, emission detection, Light Detection and Ranging (LIDAR) devices, cameras, radar devices, ultrasonic devices, 3D time-of-flight (TOF) lasers, and the like. As one example, the sensor group 240 may detect various attributes of the environment surrounding the vehicle 102. In particular, the sensor group 240 may include one or more sensors working together to generate data describing the terrain and other objects within at least a portion of the area surrounding the vehicle 102. Further, the sensor group 240 may measure or collect information about vehicle dynamics and operation, such as speed, steering position, yaw rate, lateral and longitudinal acceleration, rotational wheel speed, ground speed, accelerator pedal position, gear shifter selection, engine speed, engine output, and throttle valve position, as examples.

The location unit 250 functions to determine the location of the vehicle 102. In one exemplary embodiment, the location unit 250 may receive or derive the location of the vehicle 102 based on data from the telematics unit 114. In particular, the location may be a function of GNSS signals received by the GNSS receiver 132 and correction signals received by the cellular receiver 124. As is typically employed, the GNSS receiver 132 receives timing information from a number of satellites, and from this information, the location unit 250 may generate a particular location (e.g., latitude and longitude) of the vehicle 102. The information received from the GNSS satellites contains errors. As examples, errors may be related to the refraction and attenuation of signals propagating through the troposphere and ionosphere. Furthermore, the broadcast orbit parameters and clock characteristics are imperfect, which will cause positioning inaccuracy or the GNSS receivers on Earth. Corrections for these GNSS errors may be provided by a number of commercial entities or government agencies. These corrections can be received through the cellular network via cellular receiver 124 or other manner such as satellite. One type of correction service is referred to as precise point positioning (PPP), which provides updated and enhanced information about orbit and clock errors in the GNSS satellites and atmospheric delay estimates. From this correction information, the location unit 250 may generate more accurate location information for the vehicle 102 than otherwise would be provided by the GNSS signals alone.

Figure 3:
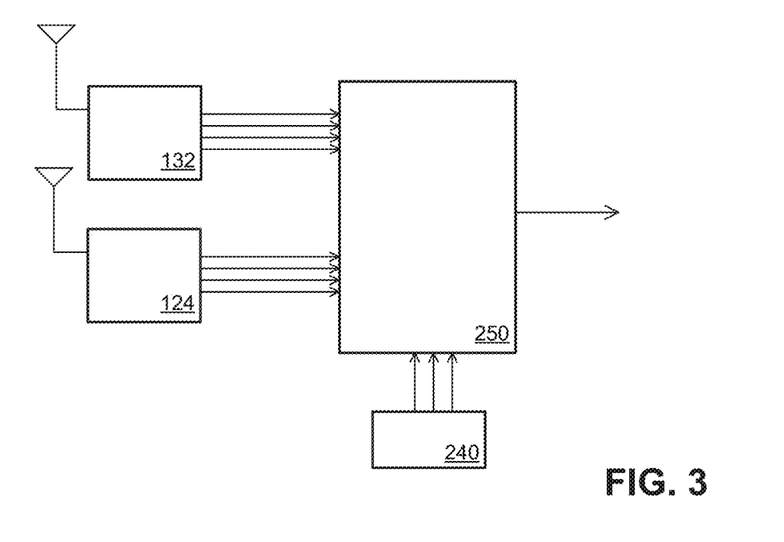
FIG. 3 is a block diagram depicting operation of a location unit of the autonomous driving system of FIG. 2 in accordance with an exemplary embodiment.

Brief reference is made to FIG. 3, which is a block diagram depicting operation of the location unit 250 in conjunction with the cellular receiver 124 and GNSS receiver 132 of the telematics unit 114 and the sensor group 240. FIGS. 1 and 2 are referenced below in the discussion of FIG. 3. As shown in FIG. 3, in one example, an external satellite communication system (e.g. GPS, GLONASS) provides radio frequency (RF) signals to the GNSS receiver 132, which in turn provides corresponding satellite location data to the location unit. In one exemplary embodiment, the GNSS signals include data associated with code measurements, carrier phase, orbits, ionosphere, time, and position fix pertaining to the satellites of the external satellite communication system. Also as depicted in FIG. 3, the cellular receiver 124 receives radio frequency (RF) signals from an external cellular communication system. In one exemplary embodiment, the cellular receiver 124 may include or otherwise correspond to a 4G-LTE modem that selectively engages in cellular packet sessions with one or more external service (or information) providers over the cellular network (or other types of wireless/communications networks), e.g. as mobile IP sessions. In turn, the cellular receiver 124 provides corresponding cellular data to the location unit 250. In one exemplary embodiment, the cellular data includes data corresponding to ionosphere delay, troposphere delay, satellite orbits, and satellite clocks pertaining to the satellites of the external satellite communication system, e.g., the external satellite communication system that provided the GNSS signals to the GNSS receiver 132. Collectively, this cellular data may be referred to as precise point positioning (PPP) data, in one example. As also depicted in FIG. 3, the sensor group 240 provides sensor data to the location unit 250, examples of which include a gyro yaw rate for the vehicle 102, differential wheel speeds for the vehicle 102, and a transmission gear status (e.g. forward or reverse) for the vehicle 102.

In one exemplary embodiment, the location unit 250 includes a Kalman filter that filters and processes the various inputs to generate various outputs. The Kalman filter may be in the form of mathematical estimate software running on an appropriate processor. In one exemplary embodiment, the Kalman filter of the location unit 250 may operate at a 10-Hz rate. The outputs of the location unit 250 include an estimate of a precise latitudinal and longitudinal position or location of the vehicle 102, along with related measures including a heading, a speed, and an elevation for the vehicle 102, in addition to related estimates for time and quality metrics pertaining to the estimates.

Returning to FIG. 2, the location unit 250 additionally facilitates evaluation of the location of the vehicle 102 in view of the mapping information stored in the database 230. For example, the location unit 250 may determine if the current location is within or proximate to a boundary of a precisely mapped road network or road, described below. As described in greater detail below, the control unit 210 may function to selectively initiate or discontinue mobile IP sessions via the cellular receiver 124 of the telematics unit 114 based on the location of the vehicle 102, particularly whether or not the current coordinates of the vehicle match those of one of the precisely mapped roads (or areas) in database 230.

Accordingly, during operation, the autonomous driving system 190 functions to selectively operate the vehicle 102 autonomously. In particular, the control unit 210 generates commands for controlling operation of the engine control module 172, steering mechanism 174, and braking arrangement 176 based on information from the location unit 250 (e.g., location and other types of positional data and mapping) and the sensor group 240 (e.g., from cameras, radar). These control commands for present and near-future operation are based on a number of parameters, including user input via the user interface 220, collected and measured data from the sensor group 240, rules and parameters from the database 230, and the current and future location of the vehicle 102 from the location unit 250. In one exemplary embodiment, the autonomous driving system 190 enables the maintenance of lane centering and forward path planning, particularly when the vehicle 102 is on a highway. Additional details about determining the location of the vehicle and mapping information may be found in, as an example, U.S. patent application Ser. No. 13/284,500, filed Dec. 15, 2011 and incorporated herein by reference.

Further information about operation of the autonomous driving system 190, particularly enabling and disabling autonomous driving, will be discussed below with reference to the method 500 of FIG. 5. However, prior to discussing the method 500, a brief description of the environment 400 of operation is provided below with reference to FIG. 4.

Figure 4:
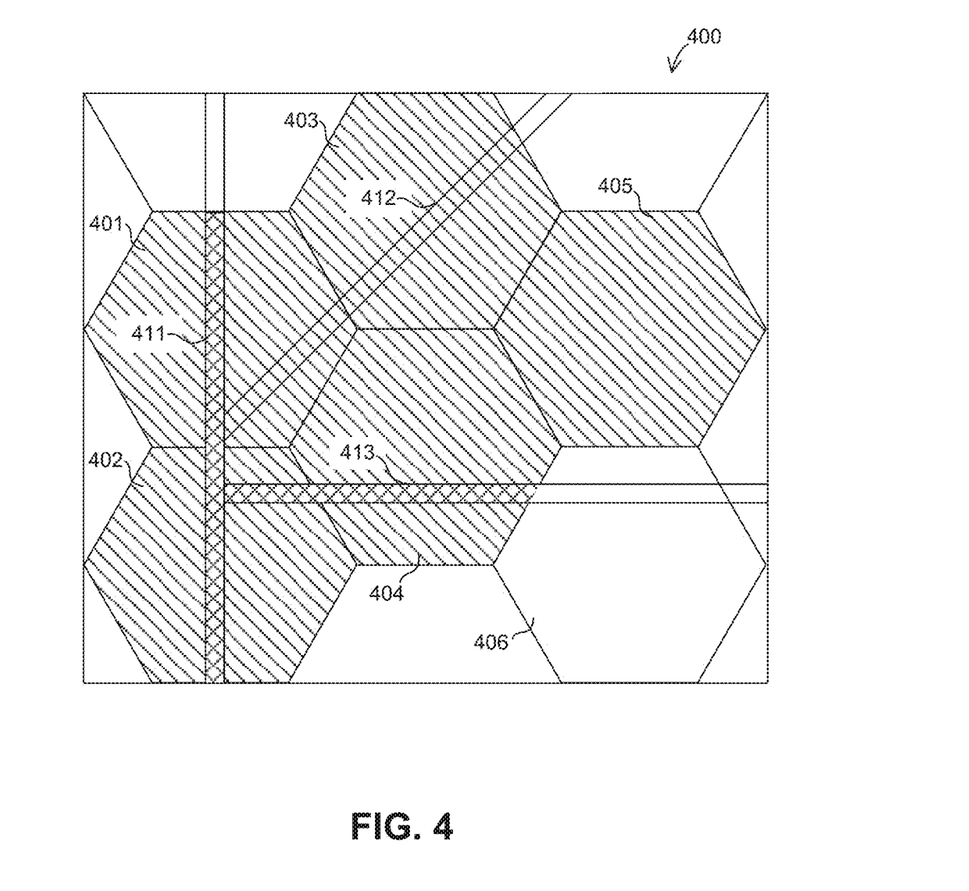
FIG. 4 is an exemplary environment for implementing the system of FIG. 1 in accordance with an exemplary embodiment.

FIG. 4 is an exemplary environment 400 for operation of the vehicle 102, including the autonomous driving system 190, in accordance with an exemplary embodiment. In particular, the environment 400 is in the form of a map subdivided into one or more polygons that represent an area or road network within the respective area. A few polygons 401, 402, 403, 404, 405, 406 are numbered for reference. As also shown in FIG. 3, the environment 400 includes one or more roads 411, 412, 413 that extend through the polygons 401-406.

Certain portions of the environment 400 have been mapped to an extent or level of detail sufficient to enable and support autonomous driving. The database 230 identifies the portions that have been mapped. The mapped portions may be identified according to polygon (e.g., by area or road network) and road. The mapped portions and roads may be referred to as precisely mapped road networks and precisely mapped roads, respectively. As an example within environment 400, polygons 401-405 have been precisely mapped, and polygon 406 has not been precisely mapped. Within polygons 401, 402, 404, portions of roads 411 and 413 have been precisely mapped. In contrast, even though polygon 403 has been precisely mapped, road 412 has not been precisely mapped. The mapped portions may vary over time as roads and road networks are mapped and/or new roads and road networks are constructed. As such, the mapping information in database 230 may be updated as necessary or desired. As described in greater detail below, the mapping information, such as that represented by the environment 400 in FIG. 4, impacts the enabling and disabling of autonomous driving. In one exemplary embodiment, the precisely mapped road network and precisely mapped roads are the designated location in which autonomous driving is available.

In one exemplary embodiment, the mapping information such as the environment 400 stored in database 230 is in the form of a two-dimensional map of an area, such as a North American road database. As one example, the mapping information contains precise coordinates for the lane boundaries of major highways and/or other roads. Such mapping information may be based on precise surveys conducted by vehicle and aircraft over time and may be periodically or regularly updated. As described below, the autonomous driving system 190 may operate to enable or otherwise prepare for autonomous driving when the location of the vehicle 102 corresponds to one of these mapped roads (or areas), which may further prompt the initiation of certain functions of the telematics unit 114. Conversely, leaving such roads (or areas) may disable or discontinue certain autonomous driving and telematics functions.

Figure 5:
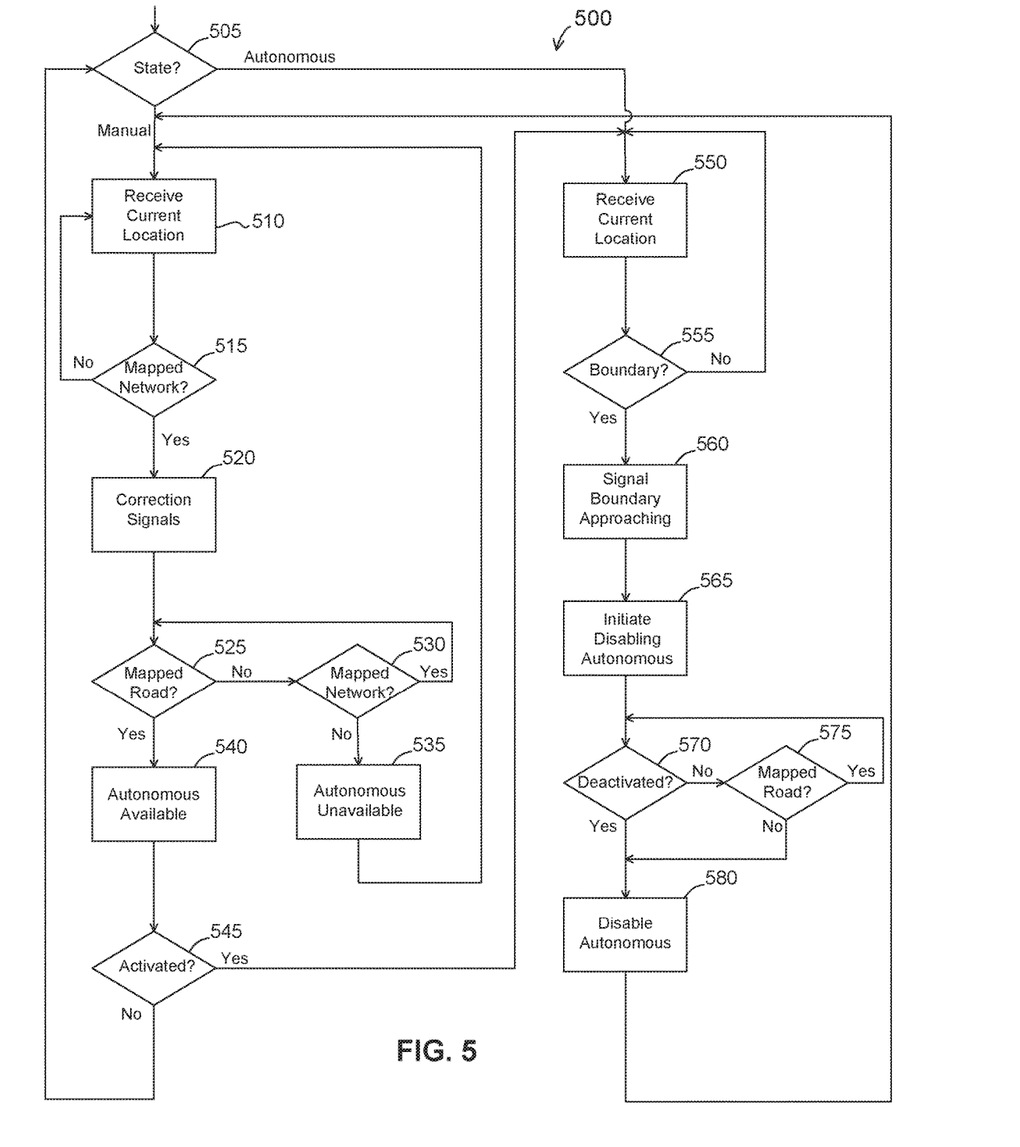
FIG. 5 is a method for enabling and disabling autonomous driving in accordance with an exemplary embodiment.

FIG. 5 is a method 500 for enabling and disabling autonomous driving in accordance with an exemplary embodiment. The method 500 of FIG. 5 may be implemented with system 110 of the vehicle 102 of FIG. 1 by the autonomous driving system 190 depicted in FIG. 2 within, as an example, the environment 400 of FIG. 4. As such, FIGS. 1-4 are referenced in the discussion of the method 500 below.

In a first step 505, the control unit 210 of the autonomous driving system 190 evaluates the current state of the vehicle 102. In particular, the control unit 210 evaluates if the vehicle 102 is operating in an autonomous mode in which the vehicle 102 may operate completely or partially without user interaction or guidance or a manual mode in which the driver or other user manually operates the vehicle 102. If the vehicle 102 is operating in the manual mode, the method 500 proceeds to step 510, and if the vehicle is operating in the autonomous mode, the method 500 proceeds to step 550. The manual mode will be initially discussed, followed by a discussion of the autonomous mode.

In step 510, the control unit 210 receives the current location of the vehicle 102. In one exemplary embodiment, the location unit 250 may determine the current location of the vehicle 102 independently and/or based on data from the telematics unit 114. As also discussed above, the location may be in the form of a latitude/longitude or a mapped reference area, which may include the particular road on which the vehicle 102 is travelling. In one exemplary embodiment, this determination may initially occur without the benefit of the GNSS corrections described above, (e.g., based on uncorrected GNSS signals).

In step 515, the control unit 210 evaluates the location of the vehicle 102 relative to mapping information, particularly with respect to the road network or area. In one exemplary embodiment, the control unit 210 evaluates if the vehicle 102 is within or proximate to an area with a precisely mapped road network, or if the vehicle 102 is outside and not proximate to an area with a precisely mapped road network, for example, by comparing the current coordinates to the precisely mapped coordinates stored in database 230. Using the example of FIG. 4, the control unit 210 determines if the current location indicates that the vehicle 102 is within or proximate to one of the mapped polygons 401-405.

If the vehicle 102 is within or proximate to an area with a precisely mapped road network, the method 500 proceeds to step 520. Otherwise, the method 500 returns to step 510 to continue monitoring the location of the vehicle 102 relative to the mapped areas. In effect, step 510 functions to identify whether or not the vehicle 102 is operating within an area that corresponds to one of the precisely mapped areas stored in database 230, thereby indicating that the autonomous driving system 190 may have (depending on the particular road) a sufficient level of detail about the environment such that autonomous driving is possible, as further described in subsequent steps.

In step 520, the control unit 210 initiates preparation for autonomous operation. In particular, the control unit 210 initiates the collection of one or more PPP correction signals from the cellular receiver 124 of the telematics unit 114 that facilitate autonomous driving. For example, the control unit 210 initiates the receipt and/or evaluation of location corrections. This may include establishing a mobile IP session to receive appropriate GNSS corrections, such as PPP corrections.

In effect, step 520 may function to predicate the establishment of the mobile IP session on whether or not the vehicle 102 is operating within a precisely mapped area. As such, this may limit the receipt and processing of cellular data to situations in which autonomous driving is otherwise possible, as opposed to continuously receiving such data even in areas that have not been precisely mapped and autonomous driving may be unavailable in any event.

In step 525, the control unit 210 evaluates the location of the vehicle 102 relative to mapping information, particularly with respect to the road on which the vehicle 102 is operating. In one exemplary embodiment, the control unit 210 evaluates if the vehicle 102 on a precisely mapped road. In other words, in one exemplary embodiment, the control unit 210 determines if the current latitude and longitude coordinates correspond to a precisely mapped road stored within the database 230. At this point, the location may have been updated with the PPP or other GNSS corrections. Using the example of FIG. 5, the control unit 210 determines if the current location indicates that the vehicle is on road 411 or 413.

If the vehicle 102 is operating on a precisely mapped road, the method 500 proceeds to step 540. If the vehicle 102 is not operating on a precisely mapped road, the method 500 proceeds to step 530.

In step 530, the control unit 210 evaluates the location relative to the road network or area on which the vehicle is operating, particularly if the vehicle 102 is within an area with a precisely mapped road network, for example, by comparing the current coordinates to the precisely mapped coordinates stored in database 230. Using the example of FIG. 4, the control unit 210 determines if the vehicle 102 is within one of the polygons 401-405. Relative to step 515, step 530 may update the location relative to the mapped information, e.g., to determine whether the vehicle 102 previously proximate to such an area entered or did not enter the area with a precisely mapped road network or that a vehicle 102 has exited an area with a precisely mapped road network.

In step 530, if the location of the vehicle 102 is within an area with a precisely mapped road network, the method 500 returns to step 525 to continue evaluating the location relative to the precisely mapped roads. In step 530, if the location of the vehicle 102 is outside of an area with a precisely mapped road network, the method 500 proceeds to step 535 in which the control unit 210 generates a signal indicating that the autonomous operation is unavailable. Generally, in this situation, if the vehicle 102 is receiving PPP correction data at the telematics unit 114, the control unit 210 may generate a signal to discontinue the mobile IP session with the PPP data. Subsequently, the method 500 returns to step 510.

Now referring to step 540, the control unit 210 generates a signal indicating that the autonomous operation is available and may be activated. In one exemplary embodiment, this signal may be provided to the driver, e.g., via a visual display or audible message provided to the driver over the user interface 220. As a result, at step 540, the control unit 210 has identified that the vehicle 102 is operating within a precisely mapped road, is receiving PPP corrections, and is on a precisely mapped road, and thus, autonomous operation is available for activation and use.

In step 545, the method 500 determines if the driver has activated the autonomous driving function. The driver may activate the autonomous driving function in any suitable manner, including the user interface 220 discussed above. In some exemplary embodiment, activation of the autonomous driving function may be automatic and step 545 may be omitted. Upon activation, the method 500 proceeds to step 550.

In step 550, the control unit 210 receives the current location of the vehicle 102. In one exemplary embodiment, the location unit 250 may determine the current location of the vehicle 102 independently and/or based on data from the telematics unit 114. As also discussed above, the location may be in the form of a latitude/longitude or a mapped reference area, which may include the particular road on which the vehicle 102 is travelling. Typically, in this step, the location is being updated with the PPP corrections since the vehicle is operating autonomously.

In step 555, the control unit 210 evaluates the location of the vehicle 102 relative to mapping information, particularly with respect to the road network or area. In one exemplary embodiment, the control unit 210 evaluates if the vehicle 102 is proximate to a boundary of the current area, for example, by comparing the current coordinates to the precisely mapped coordinates stored in database 230. As noted above, autonomous operation generally occurs in areas with precisely mapped road networks and roads. As such, the control unit 210 determines if the vehicle 102 is preparing to leave such areas.

If the vehicle 102 is approaching the end of an area with a precisely mapped road network, the method 500 proceeds to step 560. Otherwise, the method 500 returns to step 550 to continue monitoring the location of the vehicle 102 relative to the mapped areas.

In step 560, the control unit 210 generates a signal indicating that the vehicle 102 is approaching the end of an area with a precisely mapped road network. In one exemplary embodiment, this signal may be provided to the driver, e.g., via a visual display or audible message provided to the driver over the user interface 220.

In step 565, the control unit 210 initiates preparation for disabling autonomous operation.

In step 570, the method 500 determines if the driver has deactivated the autonomous driving function. The driver may deactivate the autonomous driving function in any suitable manner, including the user interface 220 discussed above. Upon deactivation, the method 500 proceeds to step 580. If the driver does not deactivate the autonomous driving function in step 570, the method 500 proceeds to step 575.

In step 575, the control unit 210 evaluates the location of the vehicle 102 relative to mapping information, particularly with respect to the road on which the vehicle 102 is operating. In one exemplary embodiment, the control unit 210 evaluates if the vehicle 102 on a precisely mapped road, for example, by comparing the current coordinates to the precisely mapped coordinates stored in database 230. If the vehicle 102 is operating on a precisely mapped road, the method 500 returns to step 570. If the vehicle 102 is not operating on a precisely mapped road, the method 500 proceeds to step 580.

In step 580, the control unit 210 disables the autonomous driving function, and the method 500 returns to step 510. In addition to disabling the autonomous operation in the form of no longer sending control signals to the engine control module 172, steering mechanism 174, and braking arrangement 176, the control unit 210 may further discontinue, if applicable, the mobile IP session receiving the PPP corrections via the telematics unit 114. Since the vehicle 102 is no longer operating on a precisely mapped road, and thus no longer operating autonomously, the PPP corrections are no longer necessary and may be discontinued. In some exemplary embodiments, the control unit 210 may initiate discontinuation of receipt of the PPP corrections in step 565.

Accordingly, the systems and methods described above establish the conditions that should be satisfied before the telematics unit establishes a packet session through a cellular network to collect PPP or other corrections data (such as orbit and clock corrections, ionosphere delay, and troposphere delays). For example, these sessions are established when the vehicle is determined to be in a mapped location, such as a precisely mapped highway, thereby enabling the computation of vehicle location within 2 meters (horizontal, 95%), as an example, whenever autonomous driving function is geographically possible.

As a result, exemplary embodiments discussed herein provide systems and methods that improve the operation of autonomous driving. For example, the exemplary embodiments monitor the location of vehicle to enable and disable the availability of autonomous operation. In effect, exemplary embodiments operate according to geo-based triggers. This may provide a more efficient use of the autonomous driving function, including the data received via the cellular networks.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An autonomous driving system for a vehicle, comprising:
   a location unit configured to determine a current location of the vehicle based on Global Navigation Satellite System (GNSS) signals and selectively based on GNSS correction signals;
   a database storing mapping information;
   a control unit coupled to the location unit and the database, the control unit configured to selectively generate autonomous driving commands for the current location in view of the mapping information; and
   a user interface coupled to the control unit,
   wherein the control unit is configured to evaluate the current location in view of the mapping information to determine if the vehicle is operating within or proximate to a mapped road network and to enable autonomous operation upon determining that the vehicle is operating within or proximate to the mapped road network,
   wherein, during autonomous operation, the control unit is configured to evaluate the current location in view of the mapping information to determine if the vehicle is proximate to an end of the mapped road network,
   wherein, during the autonomous operation, the control unit is configured to generate a first message to a driver of the vehicle via the user interface upon determining that the vehicle is proximate to the end of the mapped road network, the first message indicating that the vehicle is proximate to the end of the mapped road network,
   wherein the control unit is configured to initiate preparation for manual operation upon determining that the vehicle is proximate to the end of the mapped road network by discontinuing receipt of the GNSS correction signals.

2. The autonomous driving system of claim 1, further comprising at least one of an engine control module, a steering mechanism, and a braking arrangement coupled to the control unit for automatically operating the vehicle according to the autonomous driving commands.

3. The autonomous driving system of claim 1,
   wherein the control unit is configured to enable the autonomous operation by initiating receipt of the GNSS correction signals.

4. The autonomous driving system of claim 3, wherein the control unit is configured to initiate the receipt of the GNSS correction signals via a cellular receiver.

5. The autonomous driving system of claim 4, wherein, prior to enabling the autonomous operation, the control unit is configured to evaluate the current location in view of the mapping information to determine if the vehicle is operating on a mapped road.

6. The autonomous driving system of claim 5,
   wherein the control unit is configured to generate a second message to a driver of the vehicle via the user interface upon determining that the vehicle is operating on the mapped road, the second message indicating the availability of the autonomous operation.

7. The autonomous driving system of claim 6, wherein the user interface is configured to accept a user input in response to the second message to initiate the autonomous operation, and wherein the control unit is configured to generate the autonomous driving commands upon receipt of the user input.

8. The autonomous driving system of claim 1, wherein the control unit is configured to evaluate the current location in view of the mapping information to determine if the vehicle is operating on a mapped road.

9. The autonomous driving system of claim 8, wherein the control unit is configured to disable the autonomous operation upon determining that the vehicle is not operating on the mapped road.

* * * * *